(12) United States Patent
Poornachandran et al.

(10) Patent No.: US 10,043,376 B1
(45) Date of Patent: Aug. 7, 2018

(54) POTENTIAL HAZARD WARNING SYSTEM

(71) Applicant: Intel Corporation, Santa Clara, CA (US)

(72) Inventors: Rajesh Poornachandran, Portland, OR (US); Rita H. Wouhaybi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/658,689

(22) Filed: Jul. 25, 2017

(51) Int. Cl.
  *G08B 1/08* (2006.01)
  *G08B 25/01* (2006.01)
  *G06N 5/04* (2006.01)
  *G08B 25/10* (2006.01)

(52) U.S. Cl.
  CPC ........... *G08B 25/016* (2013.01); *G06N 5/04* (2013.01); *G08B 25/10* (2013.01)

(58) Field of Classification Search
  CPC ......... G08B 25/016; G08B 25/10; G06N 5/04
  USPC ..................... 340/539.11, 426, 430
  See application file for complete search history.

(56) References Cited

U.S. PATENT DOCUMENTS

| | | | | |
|---|---|---|---|---|
| 4,897,630 A * | 1/1990 | Nykerk | ............... | B60R 25/04 340/309.16 |
| 2012/0191502 A1 * | 7/2012 | Gross | ............... | G06Q 10/0633 705/7.27 |
| 2013/0211707 A1 * | 8/2013 | Washlow | ............... | G01S 7/003 701/411 |
| 2015/0106889 A1 * | 4/2015 | Sharabani | ............... | H04L 63/1416 726/5 |
| 2016/0378918 A1 * | 12/2016 | VanderMolen | ............... | G06F 19/322 705/3 |
| 2017/0041036 A1 * | 2/2017 | Phung | ............... | H04B 1/3888 |
| 2017/0129491 A1 * | 5/2017 | Tatourian | ............... | B60W 30/188 |

OTHER PUBLICATIONS

Savedge, Jenn, "Ecologists Counting on Oysters to Clean up Polluted Waters", ThoughCo., retrieved from thoughtco.com/oysters-to-clean-up-polluted-bronx-river-1140682, Jan. 24, 2016, 3 pages.

"Crowd-Sourcing Space Radiation Hazard Monitoring", The Aerospace Corporation, retrieved from aerospace.org/crosslinkmag/fall-2014/crowd-sourcing-space-radiation-hazard-monitoring/, Sep. 1, 2014, 2 pages.

"Disney gator attack: 2-year-old Nebraska boy found dead", CNN, retrieved from cnn.com/2016/06/15/us/alligator-attacks-child-disney-florida/, retrieved on Jun. 8, 2017, 8 pages.

(Continued)

*Primary Examiner* — Ojiako Nwugo
(74) *Attorney, Agent, or Firm* — Jordan IP Law, LLC

(57) ABSTRACT

Systems, apparatuses and methods may provide for technology that conducts a rule based inference analysis of crowdsource data to detect a hazard condition that is relevant to a user, personalize a warning of the hazard condition to the user based on one or more user preferences, and send the personalized warning to a client device associated with the user. In one example, the technology conducts a rule based classification of the crowdsource data, wherein the rule based inference analysis is conducted based on the rule based classification.

20 Claims, 9 Drawing Sheets

(56) References Cited

OTHER PUBLICATIONS

"Computer-mediated reality", Wikipedia, retrieved from en.wikipedia.org/wiki/Computer-mediated_reality, retrieved on Jun. 8, 2017, 3 pages.
"Report a Hazard", Eye on Calderdale, retrieved from eyeoncalderdale.com/report-a-hazard, retrieved on Jun. 8, 2017, 1 page.
Van Allen, Fox, "Google Maps Now Features Real-time Crowdsourced Accident Info", Techlicious, Aug. 20, 2013, 3 pages.
Pullen, John Patrick, "6 Times People Died While Taking Selfies", Time, retrieved from time.com/4257429/selfie-deaths/, Mar. 14, 2016, 2 pages.
"List of selfie-related injuries and deaths" Wikipedia, retrieved from en.wikipedia.org/wiki/List_of selfie-related_injuries_and_deaths, retrieved on Jun. 8, 2017, 21 pages.
Neugebauer, Cimaron, "Utah DOT Releases First Crowd-Sourced Road Hazard Smartphone App", retrieved from govtech.com/applications/UDOT-releases-first-crowd-sourced-road-hazard-smartphone-app.html, Nov. 14, 2014, 4 pages.
"Free Community-based Mapping, Traffic & Navigation App", retrieved from waze.com/about/dev#sdk, retrieved on Jun. 8, 2017, 3 pages.

\* cited by examiner

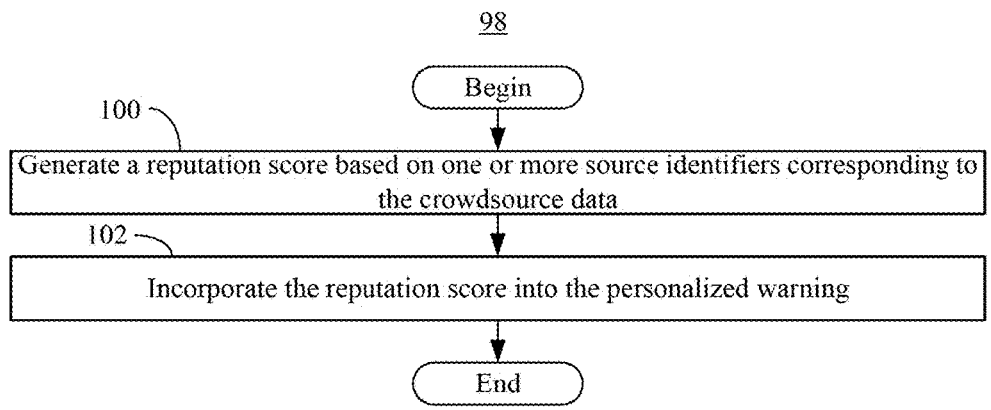
FIG. 5
FIG. 6
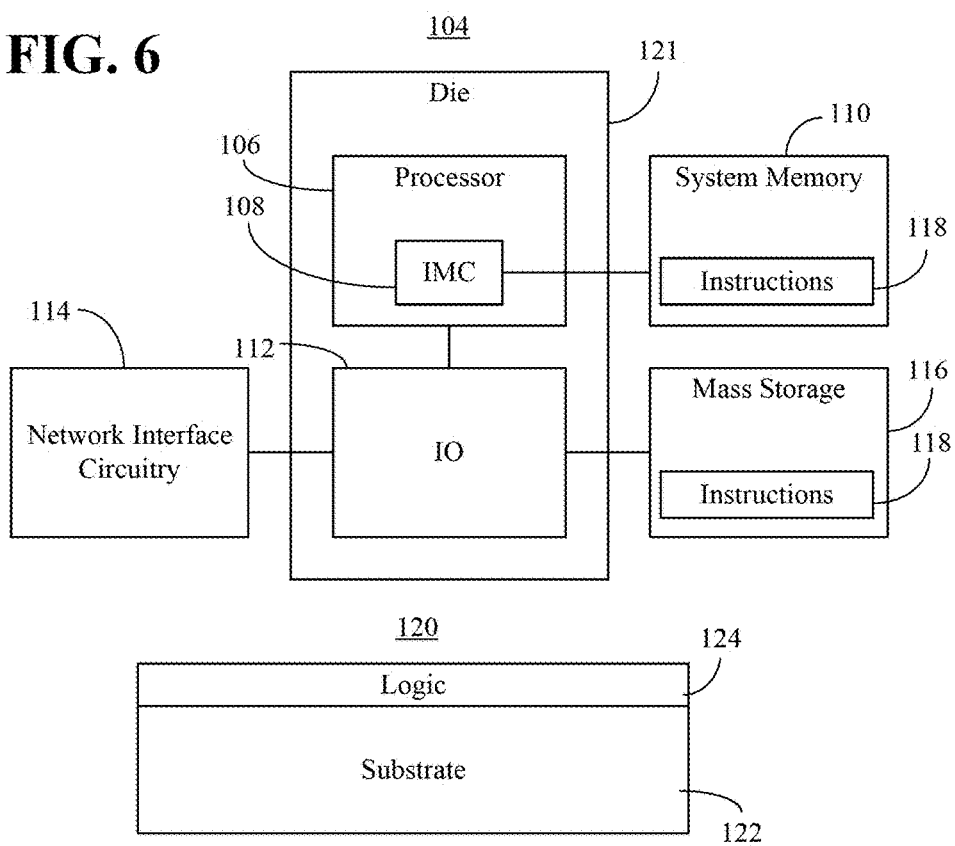
FIG. 7

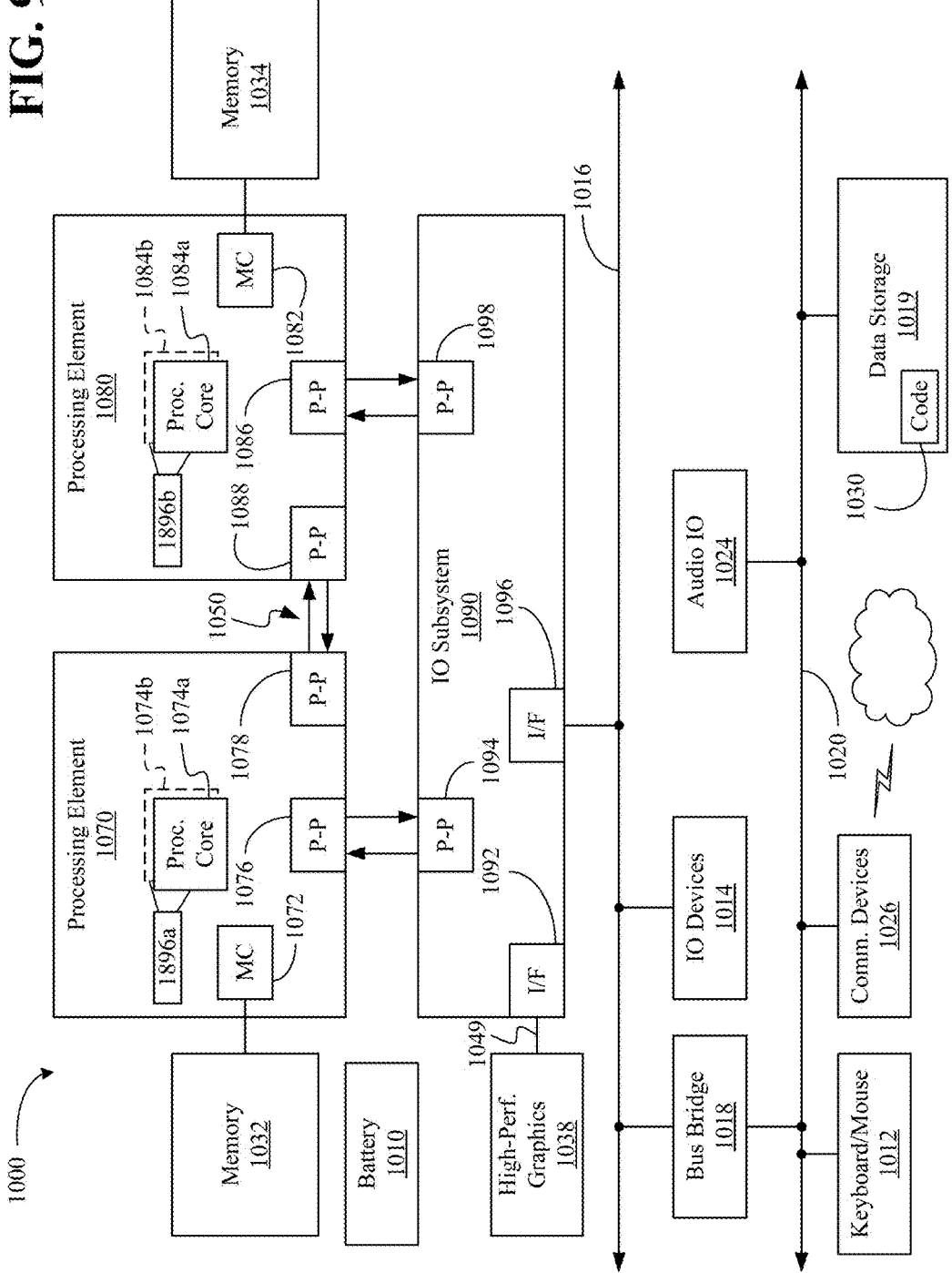

POTENTIAL HAZARD WARNING SYSTEM

TECHNICAL FIELD

Embodiments generally relate to warning system technology. More particularly, embodiments relate to potential hazard warning system technology that generates personalized warnings.

BACKGROUND

Conventional hazard warning solutions such as physical signage may be aesthetically unappealing, over-inclusive (e.g., relevant to only a subset of passersby), difficult to comprehend (e.g., by foreign visitors) and reactive (e.g., posted only after harm has occurred).

BRIEF DESCRIPTION OF THE DRAWINGS

The various advantages of the embodiments will become apparent to one skilled in the art by reading the following specification and appended claims, and by referencing the following drawings, in which:

FIG. 5 is a flowchart of an example of a method of operating a computing system to score personalized warnings according to an embodiment;

FIG. 6 is a block diagram of an example of a potential hazard warning system according to an embodiment;

FIG. 7 is an illustration of an example of a semiconductor package apparatus according to an embodiment;

FIG. 9 is a block diagram of an example of a computing system according to an embodiment.

DESCRIPTION OF EMBODIMENTS

Figure 1:
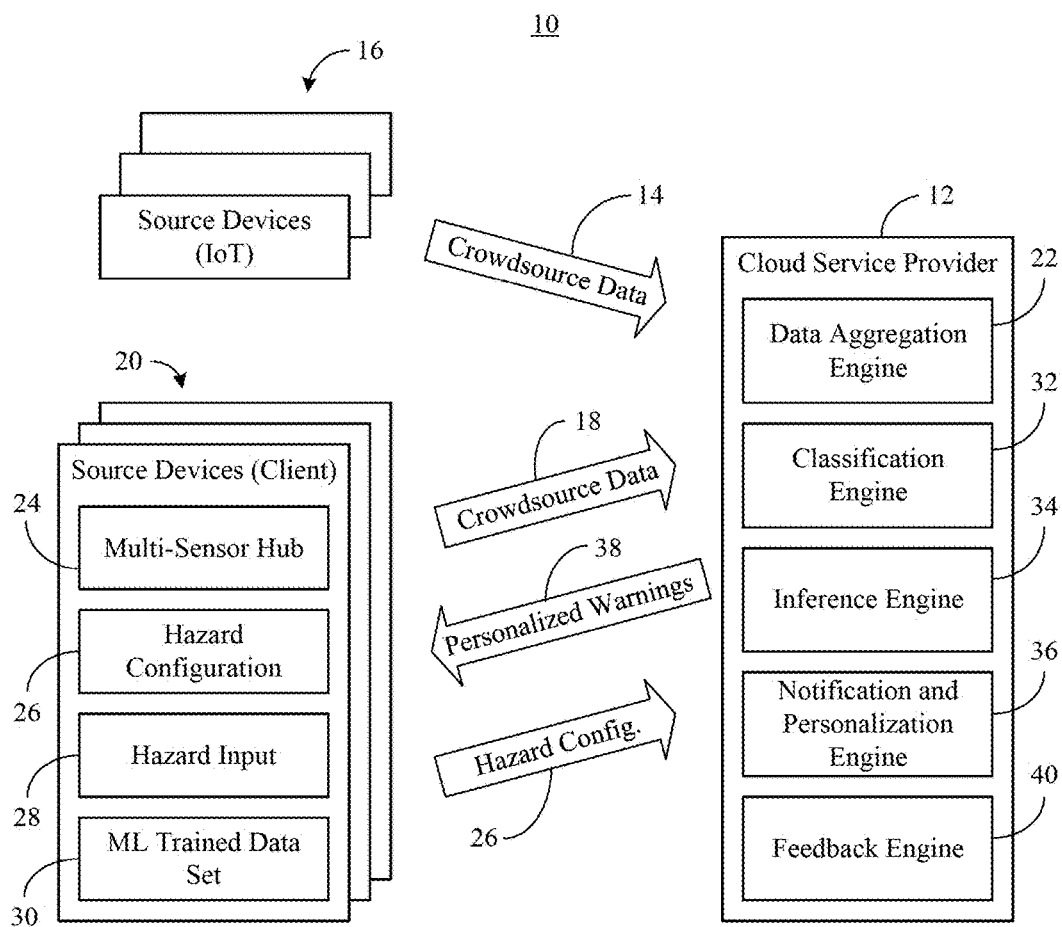
FIG. 1 is a block diagram of an example of a potential hazard warning system architecture according to an embodiment.

Turning now to FIG. 1, a potential hazard warning system (PHWS) architecture 10 is shown. The illustrated architecture 10 includes a cloud service provider 12 that receives crowdsource data 14 from a plurality of Internet of Things (IoT) devices 16 (e.g., IoT source devices). The IoT devices 16 may include audio sensors (e.g., microphones), video capture devices (e.g., webcams, camcorders), cameras (e.g., image capture devices), environmental sensors (e.g., temperature, humidity, altitude, electrical power), database systems (e.g., governmental agency and/or park ranger databases), and so forth. Accordingly, the crowdsource data 14 may be aggregated via a disparate set of networks (e.g., multiple Internet Protocol/IP networks) or via a homogeneous network over time. The illustrated cloud service provider 12 also receives crowdsource data 18 from a plurality of client devices 20 (e.g., client source devices), which may include desktop computers, notebook computers, tablet computers, convertible tablets, personal digital assistants (PDAs), mobile Internet devices (MIDs), wearable devices, media players, vehicular devices (e.g., onboard electrical systems), etc.

Each client device 20 may include a multi-sensor hub 24 that collects data similar to the data generated by the IoT devices 16. Additionally, hazard configuration data 26 may specify the types of hazards (e.g., environmental dangers, crime risks, illegal materials, language mismatch dangers) to be tracked for the user/individual associated with the client device 20 and hazard input data 28 (e.g., received from the user) may describe and/or characterize various hazards encountered by the user of the client device 20. Each client device 20 may also include a machine language (ML) trained data set 30 that results from one or more training procedures conducted on the client devices 20. The training procedures may generally involve collecting hazard input in response to known conditions and/or settings.

The cloud service provider 12 may include a data aggregation engine 22 that accumulates the crowdsource data 14, 18 in accordance with one or more configurable aggregation policies. For example, the aggregation policies may specify sampling intervals for the IoT devices 16 and/or the client devices 20 on a per device or grouped basis. A classification engine 32 may perform/conduct a rule based classification (e.g., machine learning classification) of the crowdsource data 14, 18. For example, audio data classification criteria may be orthogonal to image classification criteria in order to achieve a multi-dimensional classification space. Thus, combinations of sounds and images might be classified as specific types of conditions such as, for example, the presence of wildlife, allergens, toxins/pollution, nearby cliffs, criminal activity, illegal materials (e.g., drugs, weapons, ammunition, explosives), different languages, and so forth.

The illustrated cloud service provider 12 also includes an inference engine 34 to conduct a rule based inference analysis of the crowdsource data 14, 18 to detect hazard conditions that are relevant to a particular user. The inference engine 34 may take into consideration the hazard configuration data 26 that specifies the types of hazards to be tracked for each user associated with the client devices 20. Thus, the user (or parent/guardian) of one client device 20 may "opt-in" for environmental danger notifications and "opt-out" from language mismatch (e.g., misinterpretation) notifications, whereas a user (or parent/guardian) of another client device 20 may opt-in for crime risk notifications and opt-out from illegal material notifications. The inference engine 34 may also take into consideration other behavioral, contextual and/or demographic attributes of the crowdsource data 14, 18 and track (e.g., record keep) the hazard conditions over time (e.g., for trending or other future analysis). The inference engine 34 may also use ML rules to resolve conflicts between sensor assertions. For example, a lowest common denominator rule may identify non-conflicting attributes between seemingly conflicting conditions (e.g., the user is at a certain altitude/elevation when some sensors indicate "indoors" at that elevation and others indicate "outdoors" at that elevation). As will be discussed in greater detail, reputation scores may also be used to resolve sensor conflicts.

A notification and personalization engine 36 may generate personalized warnings 38 of the hazard conditions to the users based at least in part on one or more user preferences, which may be reflected in the hazard configuration data 26. The illustrated notification and personalization engine 36 sends the personalized warnings 38 to the client devices 20. The personalized warnings 38 may generally provide a graphic visualization of the intensity and risk of various hazards. More particularly, the characteristics of delivery may include text, translated language, audio, media, augmented reality (AR), virtual reality (VR), heads up displays (HIDs), adaptive driver assistance systems (ADASs), etc., depending on the user in question.

Additionally, a feedback engine 40 may obtain contextual feedback with respect to the personalized warnings 38 and adapt one or more inference rules associated with the rule based inference analysis to the contextual feedback in realtime. Thus, the personalized warnings 38 may be learned by the cloud service provider 12 as the inferences drawn from the crowdsource data 14, 18 adjust over time. The feedback engine 40 may also include a cultural rule checker that confirms the choice of words used in the personalized warnings 38 to avoid unpleasant reactions by the users when dynamic translation is used. The various components of the cloud service provider 12 may be implemented in logic instructions, configurable logic, fixed-functionality hardware logic, etc., or any combination thereof. Moreover, the computing (e.g., sensing, processing, analysis, machine learning, etc.) may be abstracted using a trusted execution environment (TEE) to achieve tamper resistant behavior or to avoid any malicious software taking over. Additionally, the exchange of the crowdsource data 14, 18, the hazard configuration data 26 and/or the personalized warnings 38 may take place in a wireless (e.g., WiFi, Bluetooth, near field communications/NFC, radio frequency identifier/RFID) and/or wired (e.g., Ethernet, Universal Serial Bus/USB) manner.

Figure 2A:
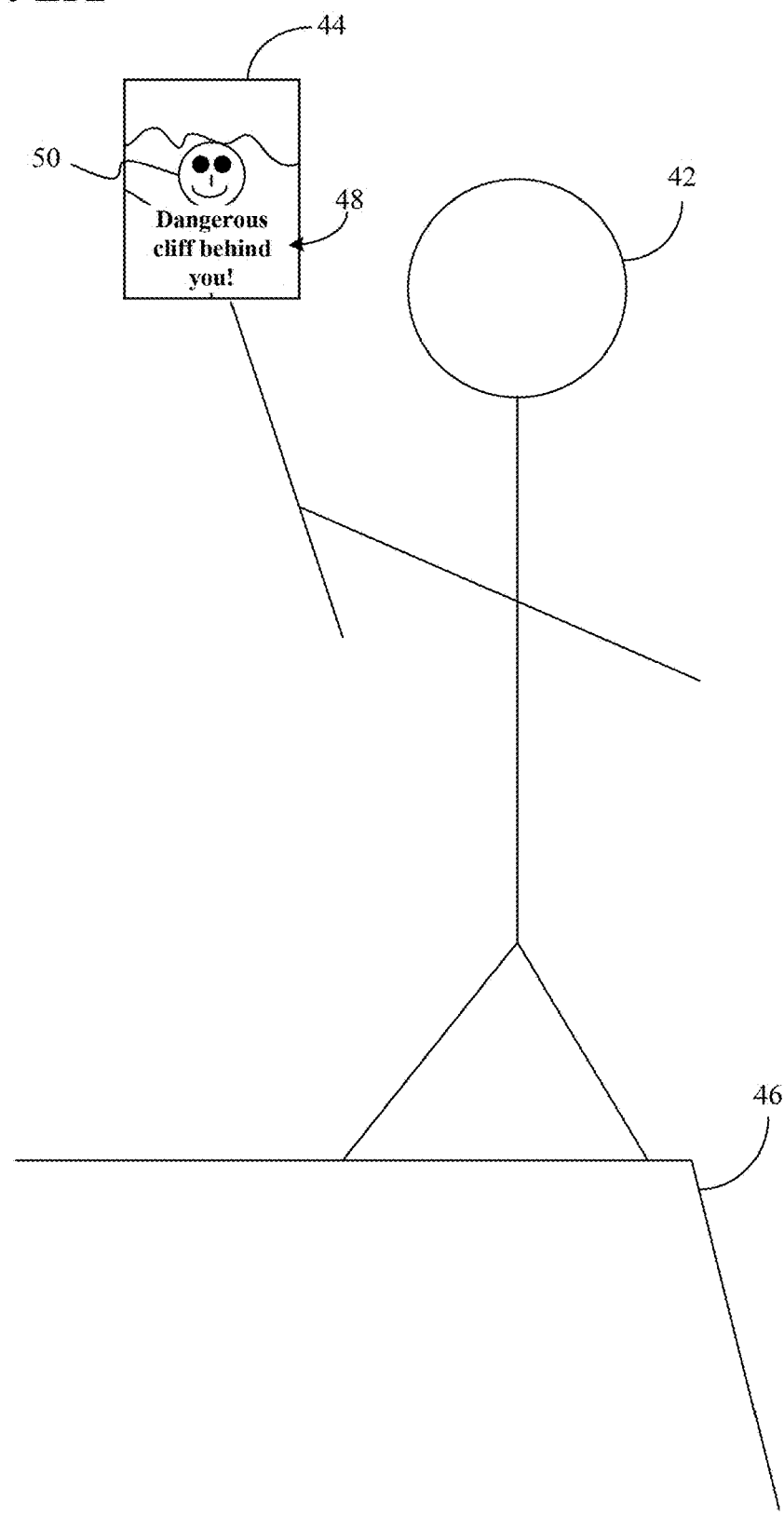
FIGS. 2A-2D are illustrations of examples of personalized warnings according to embodiments.

FIG. 2A shows an example in which a user 42 (e.g., individual, person) takes a "selfie" 50 with a client device 44. In the illustrated example, a cliff 46 located behind the user 42 presents a potential hazard to the user 42, who is looking the other way. The cliff 46 may be detected by automatically comparing the image of the selfie 50 to other terrain images contained within crowdsource data such as, for example, the crowdsource data 14, 18 (FIG. 1) for the given location (e.g., "geo-fence"). Thus, machine language techniques may both classify the surroundings as including the cliff 46 and infer from the selfie 50 that the cliff 465 poses a potential hazard to the user 42. In such a case, an annotation 48 (e.g., "Dangerous cliff behind you") may be added to the image of the selfie 50 (e.g., augmented reality/AR). Of particular note is that the annotation 48 does not involve posting aesthetically unappealing signs in the area of the cliff 46, is not over-inclusive to the extent that it may only be presented to individuals in the vicinity of the cliff 46, is easy to comprehend and may be proactive to the extent that it is implemented prior to individuals stepping over the cliff 46. With further regard to the proactive nature of the annotation 48, the hazard condition may be identified from crowdsourced images captured by other individuals, wherein machine language inferences may be drawn from the crowdsourced images (e.g., combining altitude sensor data with image data).

Figure 2B:
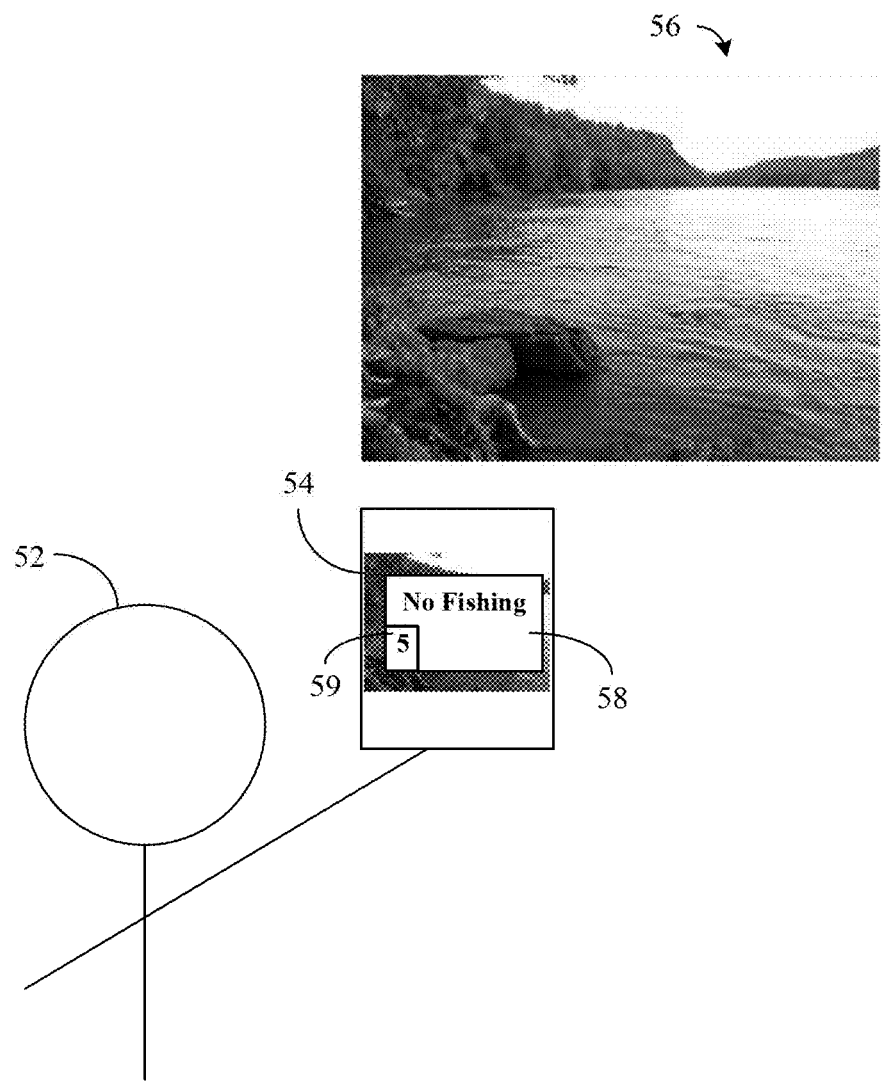

FIG. 2B shows another example in which a user 52 captures an image 54 of a lake 56 in front of the user 52. In the illustrated example, a machine language determination is made that fishing in the lake 56 may be hazardous to the user 52 (e.g., based on governmental data indicating high levels of pollution, toxins and/or allergens, crowdsourced images indicating loose footing areas, etc.). Accordingly, a simulated sign 58 (e.g., "No Fishing" AR element) may be added to the image 54. Thus, the simulated sign 58 does not involve posting aesthetically unappealing physical signs in the area of the lake 56, is not over-inclusive to the extent that it may only be presented to individuals in the vicinity of the lake 56, is easy to comprehend and may be proactive to the extent that it is implemented prior to individuals consuming fish from the lake 56.

Additionally, a reputation score 59 (e.g., "5") may be generated based on one or more source identifiers (IDs, e.g., device IDs, media access control/MAC addresses, Internet Protocol/IP addresses, etc.) corresponding to the crowdsource data, wherein the reputation score 59 is incorporated into the simulated sign 58. For example, the source identifiers may be used to determine whether portions of the crowdsource data originated from client devices and/or IoT devices that were within proximity of the lake 56 during generation of the crowdsource data, have a history of providing accurate sensor data, and so forth. In the illustrated example, the reputation score 59 might indicate a relatively high reputation for the simulated sign 58.

The personalized warning may also include a boundary notification that is selected based on the current user context. For example, in a fast-moving vehicle, the warning might be presented at a distance of 0.25 miles away from the hazard condition, whereas when the user is walking the warning might be presented at a distance of 100 feet from the hazard condition. In yet another example, a warning that informs a parent about an unpredictable toddler wandering too close to a pool might have a greater notification boundary than a warning relating to an adult who may be at risk. Other contextual attributes such as seasons, road conditions (e.g., icy roads), weather events (e.g., rain), etc., may also be used to personalize the warning.

Figure 2C:
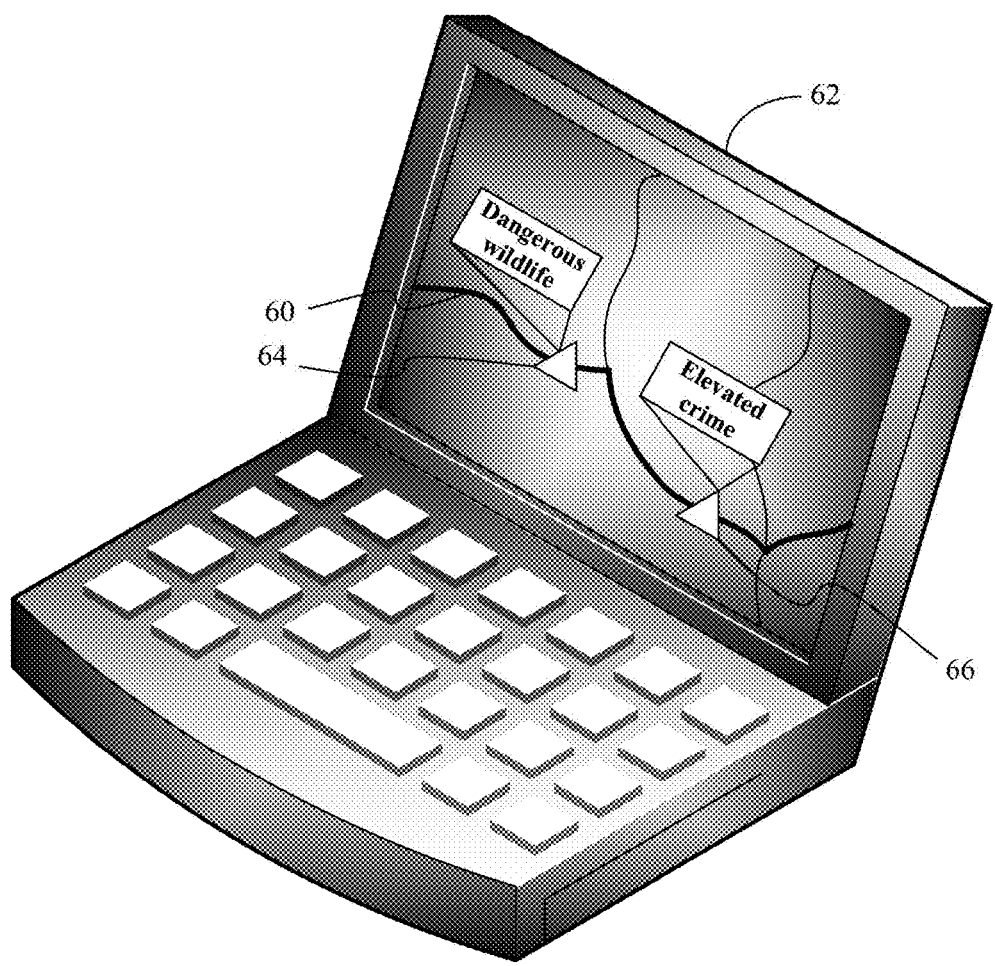

Turning now to FIG. 2C, yet another example is shown in which a navigation route 60 is generated by a trip planner application running on a client device (e.g., to facilitate navigation between two locations). In the illustrated example, a first personalized warning 64 indicates an area along the route 60 where dangerous wildlife has been inferred and/or determined to exist and a second personalized warning 66 indicates an area along the route 60 where an elevated crime rate has been inferred and/or determined to exist (e.g., based on crowdsource data). Accordingly, the illustrated solution may enable the user to select alternate, safer areas along the route 60 to camp, stop for gas, and so forth.

Figure 2D:
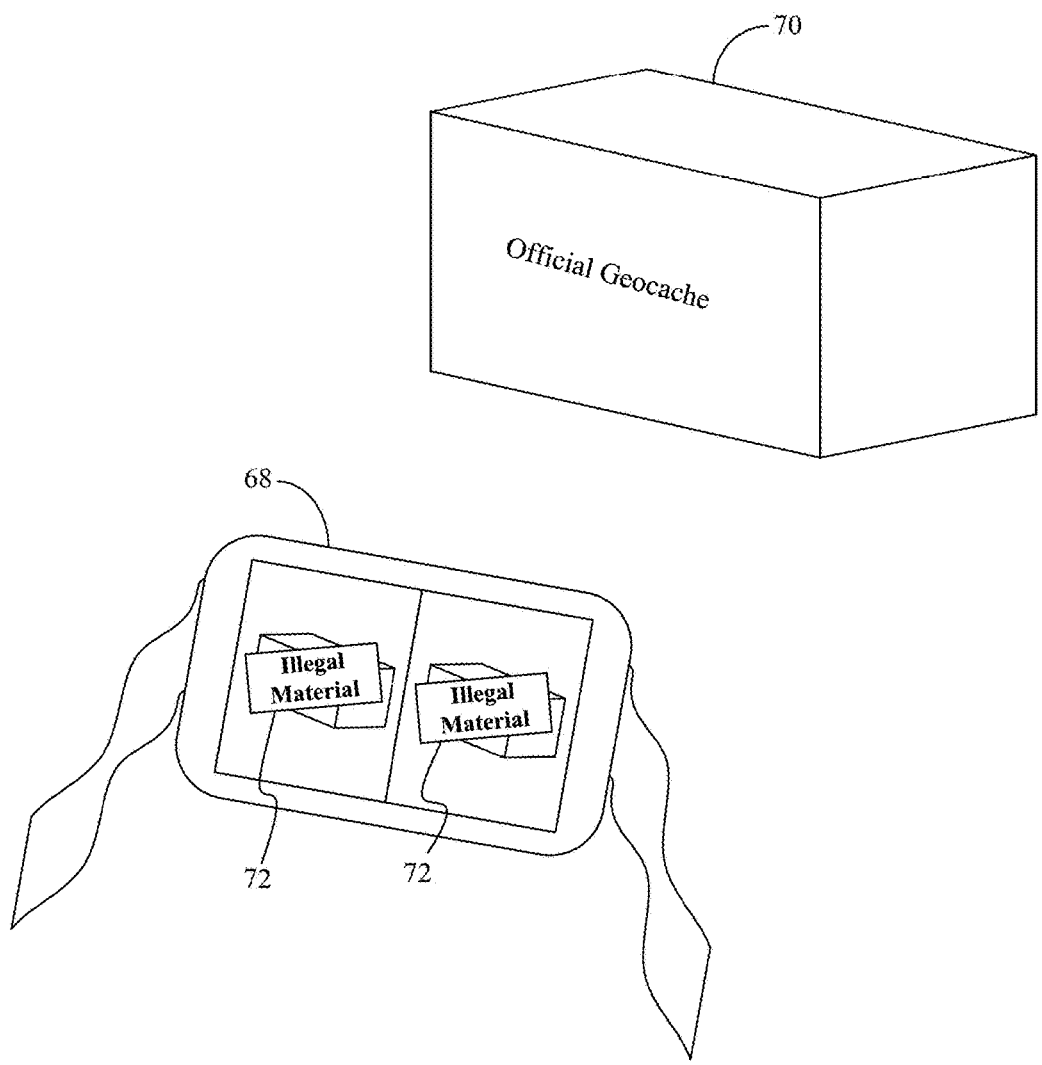

FIG. 2D shows an example in which a mediated reality (e.g., AR, VR) headset 68 is used to view a geocache container 70. In the illustrated example, a rule based inference analysis of crowdsource data has resulted in a determination that one or more illegal materials (e.g., drugs, weapons, ammunition, explosives) are inside the container 70. In such a case, an annotation 72 may be added to left and right images of the container 70. Other personalized warnings of various potential hazards may be generated, depending on the circumstances.

Figure 3:
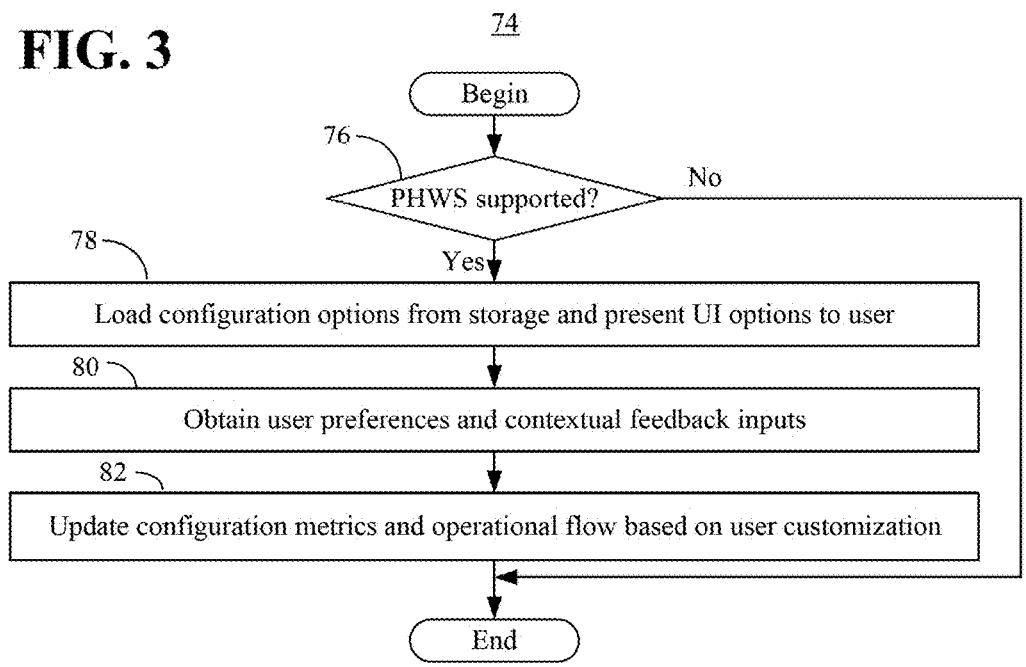
FIG. 3 is a flowchart of an example of a method of operating a cloud service provider to configure hazard warning notifications according to an embodiment.

FIG. 3 shows a method 74 of operating a computing system such as a cloud service provider, potential hazard warning system, etc., to configure hazard warning notifications. The method 74 may generally be implemented in a computing system such as, for example, the cloud service provider 12 (FIG. 1), already discussed. More particularly, the method 74 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 74 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 76 determines whether a potential hazard warning system (PHWS) is supported. If so, block 78 loads configuration options from storage and presents user interface (UI) options to the user. Additionally, user preferences and contextual feedback inputs (e.g., with respect to previous personalized warnings) may be obtained at block 80, wherein illustrated block 82 updates configuration metrics and operational flows based on the user customizations. Block 82 may include, for example, adapting one or more inference rules associated with a rule based inference analysis to the contextual feedback in real-time. The adaptations of block 82 may also provide for confirming that dynamic translations do not conflict with cultural rules and/or expectations. If it is determined at block 76 that the PHWS is not supported, the illustrated method 74 terminates.

Figure 4:
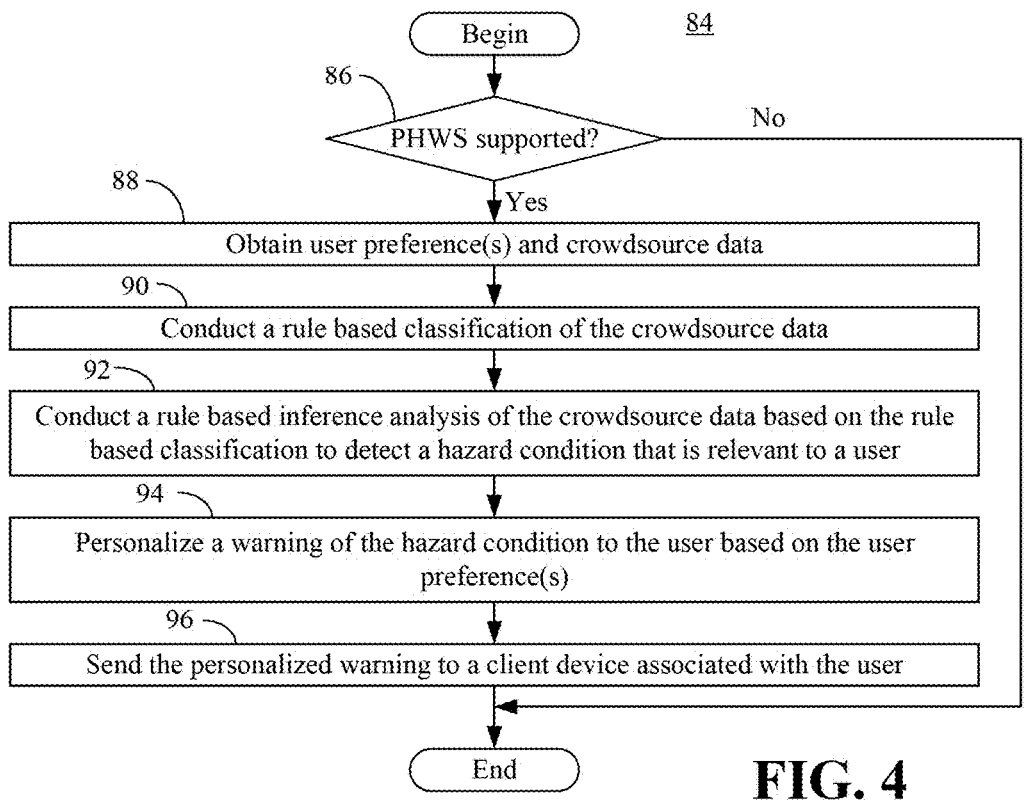
FIG. 4 is a flowchart of an example of a method of operating a computing system to generate personalized warnings according to an embodiment.

FIG. 4 shows a method 84 of operating a computing system to generate personalized warnings. The method 84 may generally be implemented in a computing system such as, for example, the cloud service provider 12 (FIG. 1), already discussed. More particularly, the method 84 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 86 determines whether a PHWS is supported. If so, block 88 may obtain one or more user preferences (e.g., in hazard configuration data) and crowdsource data, wherein a rule based classification of the crowdsource data is conducted at illustrated block 90. Additionally, a rule based inference analysis of the crowdsource data may be conducted at block 92 based on the rules based classification to detect a hazard condition that is relevant to a user (e.g., a specific individual). Block 92 may take into consideration various behavioral, contextual and/or demographic attributes of the crowdsource data. Block 94 may personalize a warning of the hazard condition to the user based on the user preference(s). The personalized warning may be sent (e.g., via a wireless and/or wired communication link) to a client device associated with the user at block 96. If it is determined at block 86 that the PHWS is not supported, the illustrated method 84 terminates.

FIG. 5 shows a method 98 of operating computing system to score personalized warnings. The method 98 may generally be implemented in a computing system such as, for example, the cloud service provider 12 (FIG. 1), already discussed. More particularly, the method 98 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 100 provides for generating a reputation score based on one or more source IDs corresponding to the crowdsource data. As already noted, the source IDs may be used to determine whether portions of the crowdsource data originated from client devices and/or IoT devices that were within proximity of the hazard condition during generation of the crowdsource data, have a history of providing accurate sensor data, and so forth. Block 102 may incorporate the reputation score into the personalized warning. The reputation score may also be used to resolve sensor conflicts. For example, data from a client device associated with a local resident may be prioritized over data from a client device associated with a non-resident (e.g., visitor) when inferring the possibility of wildlife frequenting a playground. Other transient or persistent hazard conflicts may also be resolved using the reputation scores.

FIG. 6 shows a potential hazard warning system 104 that may be readily substituted for the cloud service provider 12 (FIG. 1), already discussed. The illustrated system 104 includes a processor 106 (e.g., host processor, central processing unit/CPU) having an integrated memory controller (IMC) 108 coupled to a system memory 110 (e.g., volatile memory, dynamic random access memory/DRAM). The processor 106 may also be coupled to an input/output (IO) module 112 that communicates with network interface circuitry 114 (e.g., network controller, network interface card/NIC) and mass storage 116 (non-volatile memory/NVM, hard disk drive/HDD, optical disk, solid state disk/SSD, flash memory).

The network interface circuitry 114 may receive crowdsource data from a plurality of source devices (not shown), wherein the system memory 110 and/or the mass storage 116 may be memory devices that store instructions 118, which when executed by the processor 106, cause the system 104 to perform one or more aspects of the method 74 (FIG. 3), the method 84 (FIG. 4) and/or the method 98 (FIG. 5), already discussed. Thus, execution of the instructions 118 may cause the system 104 to conduct a rule based inference analysis of the crowdsource data to detect a hazard condition that is relevant to a user, personalize a warning of the hazard condition to the user based on one or more user preferences, and send, via the network interface circuitry 114, the personalized warning to a client device associated with the user. The processor 106 and the IO module 112 may be incorporated into a shared die 121 as a system on chip (SoC).

FIG. 7 shows a semiconductor package apparatus 120 (e.g., chip) that includes a substrate 122 (e.g., silicon, sapphire, gallium arsenide) and logic 124 (e.g., transistor array and other integrated circuit/IC components) coupled to the substrate 122. The logic 124, which may be implemented in configurable logic and/or fixed-functionality logic hardware, may generally implement one or more aspects of the method 74 (FIG. 3), the method 84 (FIG. 4) and/or the method 98 (FIG. 5), already discussed. Additionally, the logic 124 may include a TEE that provides tamper resistant behavior and reduces the likelihood of malicious software taking control.

Figure 8:
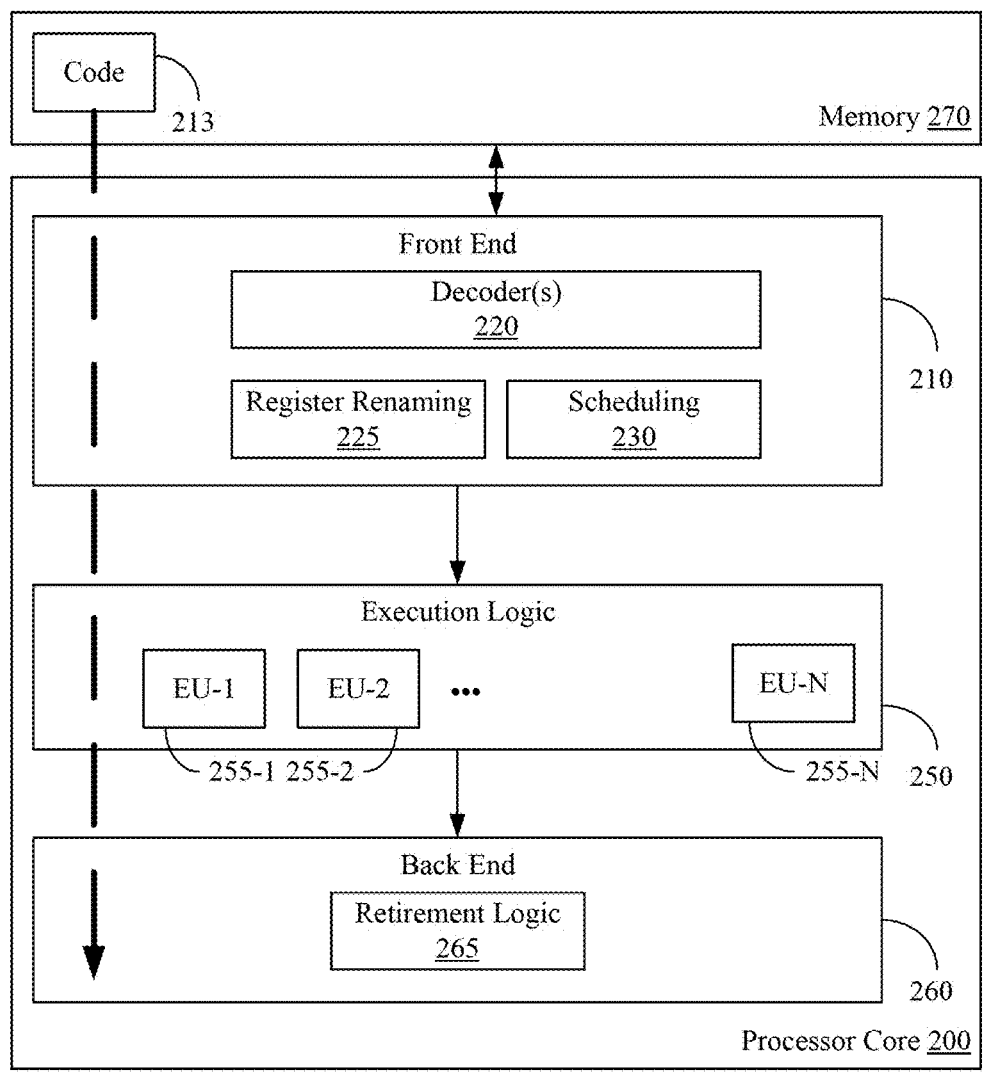
FIG. 8 is a block diagram of an example of a processor according to an embodiment.

FIG. 8 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 8, a processing element may alternatively include more than one of the processor core 200 illustrated in FIG. 8. The processor core 200 may be a single-threaded core or, for at least one embodiment, the processor core 200 may be multithreaded in that it may include more than one hardware thread context (or "logical processor") per core.

FIG. 8 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the method 74 (FIG. 3), the method 84 (FIG. 4) and/or the method 98 (FIG. 5), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 8, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 9, shown is a block diagram of a computing system 1000 embodiment in accordance with an embodiment. Shown in FIG. 9 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 9 may be implemented as a multi-drop bus rather than point-to-point interconnect.

As shown in FIG. 9, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 8.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 9, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 9, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 9, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 74 (FIG. 3), the method 84 (FIG. 4) and/or the method 98 (FIG. 5), already discussed, and may be similar to the code 213 (FIG. 8), already discussed. Further, an audio I/O 1024 may be coupled to second bus 1020 and a battery 1010 may supply power to the computing system 1000.

Note that other embodiments are contemplated. For example, instead of the point-to-point architecture of FIG. 9, a system may implement a multi-drop bus or another such communication topology. Also, the elements of FIG. 9 may alternatively be partitioned using more or fewer integrated chips than shown in FIG. 9.

Additional Notes and Examples

Example 1 may include a potential hazard warning computing system comprising network interface circuitry to receive crowdsource data from a plurality of source devices, a processor coupled to the network interface circuitry, and one or more memory devices coupled to the processor, the one or more memory devices including instructions, which when executed by the processor, cause the system to conduct a a rule based inference analysis of the crowdsource data to detect a hazard condition that is relevant to a user, personalize a warning of the hazard condition to the user based on one or more user preferences, and send, via the network interface circuitry, the personalized warning to a client device associated with the user.

Example 2 may include the system of Example 1, wherein the instructions, when executed, cause the potential hazard warning system to conduct a rule based classification of the crowdsource data, and wherein the rule based inference analysis is to be conducted based on the rule based classification.

Example 3 may include the system of Example 1, wherein the instructions, when executed, cause the potential hazard warning system to generate a reputation score based on one or more source identifiers corresponding to the crowdsource data, and incorporate the reputation score into the personalized warning.

Example 4 may include the system of Example 1, wherein the instructions, when executed, cause the potential hazard warning system to obtain contextual feedback with respect to the personalized warning, and adapt one or more inference rules associated with the rule based inference analysis to the contextual feedback in real-time.

Example 5 may include the system of Example 1, wherein the instructions, when executed, cause the potential hazard warning system to track multiple hazard conditions over time, wherein the hazard conditions are to include one or more of a language mismatch, an environmental danger, a crime risk or an illegal material, and wherein the personalized warning is to include one or more of an annotation to an image of a physical sign, a simulated sign or a boundary notification.

Example 6 may include the system of any one of Examples 1 to 5, wherein the personalized warning is to be sent to one or more of a wearable device, a handheld device or a vehicular device.

Example 7 may include a semiconductor package apparatus comprising a substrate, and logic coupled to the substrate, wherein the logic includes one or more of configurable logic or fixed-functionality hardware logic, the logic coupled to the substrate to conduct a rule based inference analysis of crowdsource data to detect a hazard condition that is relevant to a user, personalize a warning of the hazard condition to the user based on one or more user preferences, and send the personalized warning to a client device associated with the user.

Example 8 may include the apparatus of Example 7, wherein the logic coupled to the substrate is to conduct a rule based classification of the crowdsource data, and wherein the rule based inference analysis is to be conducted based on the rule based classification.

Example 9 may include the apparatus of Example 7, wherein the logic coupled to the substrate is to generate a reputation score based on one or more source identifiers corresponding to the crowdsource data, and incorporate the reputation score into the personalized warning.

Example 10 may include the apparatus of Example 7, wherein the logic coupled to the substrate is to obtain contextual feedback with respect to the personalized warning, and adapt one or more inference rules associated with the rule based inference analysis to the contextual feedback in real-time.

Example 11 may include the apparatus of Example 7, wherein the logic is to track multiple hazard conditions over time, wherein the hazard conditions are to include one or more of a language mismatch, an environmental danger, a crime risk or an illegal material, and wherein the personalized warning is to include one or more of an annotation to an image of a physical sign, a simulated sign or a boundary notification.

Example 12 may include the apparatus of any one of Examples 7 to 11, wherein the personalized warning is to be sent to one or more of a wearable device, a handheld device or a vehicular device.

Example 13 may include the apparatus of any one of Examples 7 to 11, wherein the logic coupled to the substrate includes a trusted execution environment.

Example 14 may include a method of operating a computing system, comprising conducting a rule based inference analysis of crowdsource data to detect a hazard condition that is relevant to a user, personalizing a warning of the hazard condition to the user based on one or more user preferences, and sending the personalized warning to a client device associated with the user.

Example 15 may include the method of Example 14, further including conducting a rule based classification of the crowdsource data, wherein the rule based inference analysis is conducted based on the rule based classification.

Example 16 may include the method of Example 14, further including generating a reputation score based on one or more source identifiers corresponding to the crowdsource data, and incorporating the reputation score into the personalized warning.

Example 17 may include the method of Example 14, further including obtaining contextual feedback with respect to the personalized warning, and adapting one or more inference rules associated with the rule based inference analysis to the contextual feedback in real-time.

Example 18 may include the method of Example 14, further including tracking multiple hazard conditions over time, wherein the hazard conditions include one or more of a language mismatch, an environmental danger, a crime risk or an illegal material, and wherein the personalized warning includes one or more of an annotation to an image of a physical sign, a simulated sign or a boundary notification.

Example 19 may include the method of any one of Examples 14 to 18, wherein the personalized warning is sent to one or more of a wearable device, a handheld device or a vehicular device.

Example 20 may include at least one computer readable storage medium comprising a set of instructions, which when executed by a computing system, cause the computing system to conduct a rule based inference analysis of crowdsource data to detect a hazard condition that is relevant to a user, personalize a warning of the hazard condition to the user based on one or more user preferences, and send the personalized warning to a client device associated with the user.

Example 21 may include the at least one computer readable storage medium of Example 20, wherein the instructions, when executed, cause the computing system to conduct a rule based classification of the crowdsource data, and wherein the rule based inference analysis is to be conducted based on the rule based classification.

Example 22 may include the at least one computer readable storage medium of Example 20, wherein the instructions, when executed, cause the computing system to generate a reputation score based on one or more source identifiers corresponding to the crowdsource data, and incorporate the reputation score into the personalized warning.

Example 23 may include the at least one computer readable storage medium of Example 20, wherein the instructions, when executed, cause the computing system to obtain contextual feedback with respect to the personalized warning, and adapt one or more inference rules associated with the rule based inference analysis to the contextual feedback in real-time.

Example 24 may include the at least one computer readable storage medium of Example 20, wherein the instructions, when executed, cause the computing system to track multiple hazard warnings over time, wherein the hazard conditions are to include one or more of a language mismatch, an environmental danger, a crime risk or an illegal material, and wherein the personalized warning is to include one or more of an annotation to an image of a physical sign, a simulated sign or a boundary notification.

Example 25 may include the at least one computer readable storage medium of any one of Examples 20 to 24, wherein the personalized warning is to be sent to one or more of a wearable device, a handheld device or a vehicular device.

Example 26 may include a semiconductor package apparatus comprising conducting a rule based inference analysis of crowdsource data to detect a hazard condition that is relevant to a user, personalizing a warning of the hazard condition to the user based on one or more user preferences, and send the personalized warning to a client device associated with the user.

Example 27 may include the apparatus of Example 26, further including means for conducting a rule based classification of the crowdsource data, wherein the rule based inference analysis is conducted based on the rule based classification.

Example 28 may include the apparatus of Example 26, further including means for generating a reputation score based on one or more source identifiers corresponding to the crowdsource data, and means for incorporating the reputation score into the personalized warning.

Example 29 may include the apparatus of Example 26, further including means for obtaining contextual feedback with respect to the personalized warning, and means for adapting one or more inference rules associated with the rule based inference analysis to the contextual feedback in real-time.

Example 30 may include the apparatus of Example 26, further including means for tracking multiple hazard conditions over time, wherein the hazard conditions are to include one or more of a language mismatch, an environmental danger, a crime risk or an illegal material, and wherein the personalized warning includes one or more of an annotation to an image of a physical sign, a simulated sign or a boundary notification.

Example 31 may include the apparatus of any one of Examples 26 to 30, wherein the personalized warning is to be sent to one or more of a wearable device, a handheld device or a vehicular device.

Thus, technology described herein may provide personalized and custom alerts in a configurable manner. The technology may also provide a dynamic and scalable solution with crowdsourced inputs that are tailored for specific user needs.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
network interface circuitry to receive crowdsource data from a plurality of source devices;
a processor coupled to the network interface circuitry; and
one or more memory devices coupled to the processor, the one or more memory devices including instructions, which when executed by the processor, cause the system to:
conduct a rule based inference analysis of the crowdsource data to detect a hazard condition that is relevant to a user;
personalize a warning of the hazard condition to the user based on one or more user preferences;
generate a reputation score based on one or more source identifiers corresponding to the crowdsource data;
incorporate the reputation score into the personalized warning; and
send, via the network interface circuitry, the personalized warning to a client device associated with the user.

2. The computing system of claim 1, wherein the instructions, when executed, cause the computing system to conduct a rule based classification of the crowdsource data, and wherein the rule based inference analysis is to be conducted based on the rule based classification.

3. The computing system of claim 1, wherein the instructions, when executed, cause the computing system to:
obtain contextual feedback with respect to the personalized warning; and
adapt one or more inference rules associated with the rule based inference analysis to the contextual feedback in real-time.

4. The computing system of claim 1, wherein the personalized warning is to be sent to one or more of a wearable device, a handheld device or a vehicular device.

5. An apparatus comprising:
a substrate; and
logic coupled to the substrate, wherein the logic includes one or more of configurable logic or fixed-functionality hardware logic, the logic coupled to the substrate to:
conduct a rule based inference analysis of crowdsource data to detect a hazard condition that is relevant to a user;
personalize a warning of the hazard condition to the user based on one or more user preferences;
generate a reputation score based on one or more source identifiers corresponding to the crowdsource data;
incorporate the reputation score into the personalized warning; and
send the personalized warning to a client device associated with the user.

6. The apparatus of claim 5, wherein the logic coupled to the substrate is to conduct a rule based classification of the crowdsource data, and wherein the rule based inference analysis is to be conducted based on the rule based classification.

7. The apparatus of claim 5, wherein the logic coupled to the substrate is to:
obtain contextual feedback with respect to the personalized warning; and
adapt one or more inference rules associated with the rule based inference analysis to the contextual feedback in real-time.

8. The apparatus of claim 5, wherein the personalized warning is to be sent to one or more of a wearable device, a handheld device or a vehicular device.

9. A method comprising:
conducting a rule based inference analysis of crowdsource data to detect a hazard condition that is relevant to a user;
personalizing a warning of the hazard condition to the user based on one or more user preferences;
generating a reputation score based on one or more source identifiers corresponding to the crowdsource data;
incorporating the reputation score into the personalized warning; and
sending the personalized warning to a client device associated with the user.

10. The method of claim 9, further including conducting a rule based classification of the crowdsource data, wherein the rule based inference analysis is conducted based on the rule based classification.

11. The method of claim 9, further including:
obtaining contextual feedback with respect to the personalized warning; and
adapting one or more inference rules associated with the rule based inference analysis to the contextual feedback in real-time.

12. The method of claim 9, wherein the personalized warning is sent to one or more of a wearable device, a handheld device or a vehicular device.

13. At least one non-transitory computer readable storage medium comprising a set of instructions, which when executed by a computing system, cause the computing system to:
conduct a rule based inference analysis of crowdsource data to detect a hazard condition that is relevant to a user;
personalize a warning of the hazard condition to the user based on one or more user preferences;
generate a reputation score based on one or more source identifiers corresponding to the crowdsource data;

incorporate the reputation score into the personalized warning; and send the personalized warning to a client device associated with the user.

14. The at least one non-transitory computer readable storage medium of claim 13, wherein the instructions, when executed, cause the computing system to conduct a rule based classification of the crowdsource data, and wherein the rule based inference analysis is to be conducted based on the rule based classification.

15. The at least one non-transitory computer readable storage medium of claim 13, wherein the instructions, when executed, cause the computing system to:

obtain contextual feedback with respect to the personalized warning; and adapt one or more inference rules associated with the rule based inference analysis to the contextual feedback in real-time.

16. The at least one non-transitory computer readable storage medium of claim 13, wherein the personalized warning is to be sent to one or more of a wearable device, a handheld device or a vehicular device.

17. A computing system comprising:

network interface circuitry to receive crowdsource data from a plurality of source devices;

a processor coupled to the network interface circuitry; and one or more memory devices coupled to the processor, the one or more memory devices including instructions, which when executed by the processor, cause the system to:

conduct a rule based inference analysis of the crowdsource data to detect a hazard condition that is relevant to a user;

personalize a warning of the hazard condition to the user based on one or more user preferences, wherein the hazard condition is to include one or more of a language mismatch, an environmental danger, a crime risk or an illegal material, and wherein the personalized warning is to include one or more of an annotation to an image of a physical sign, a simulated sign or a boundary notification; and send, via the network interface circuitry, the personalized warning to a client device associated with the user.

18. An apparatus comprising:

a substrate; and logic coupled to the substrate, wherein the logic includes one or more of configurable logic or fixed-functionality hardware logic, the logic coupled to the substrate to:

conduct a rule based inference analysis of crowdsource data to detect a hazard condition that is relevant to a user;

personalize a warning of the hazard condition to the user based on one or more user preferences, wherein the hazard condition is to include one or more of a language mismatch, an environmental danger, a crime risk or an illegal material, and wherein the personalized warning is to include one or more of an annotation to an image of a physical sign, a simulated sign or a boundary notification; and send the personalized warning to a client device associated with the user.

19. A method comprising:

conducting a rule based inference analysis of crowdsource data to detect a hazard condition that is relevant to a user;

personalizing a warning of the hazard condition to the user based on one or more user preferences, wherein the hazard condition includes one or more of a language mismatch, an environmental danger, a crime risk or an illegal material, and wherein the personalized warning includes one or more of an annotation to an image of a physical sign, a simulated sign or a boundary notification; and sending the personalized warning to a client device associated with the user.

20. At least one non-transitory computer readable storage medium comprising a set of instructions, which when executed by a computing system, cause the computing system to:

conduct a rule based inference analysis of crowdsource data to detect a hazard condition that is relevant to a user;

personalize a warning of the hazard condition to the user based on one or more user preferences, wherein the hazard condition is to include one or more of a language mismatch, an environmental danger, a crime risk or an illegal material, and wherein the personalized warning is to include one or more of an annotation to an image of a physical sign, a simulated sign or a boundary notification; and send the personalized warning to a client device associated with the user.

* * * * *